United States Patent [19]

Katzer et al.

[11] Patent Number: 5,543,095
[45] Date of Patent: Aug. 6, 1996

[54] PROCESS FOR PRODUCING SHAPED BODIES HAVING THERMALLY INSULATING PROPERTIES

[75] Inventors: Hans Katzer; Günter Kratel, both of Durach; Beate Biller, Kempten, all of Germany

[73] Assignee: Wacker-Chemie GmbH, München, Germany

[21] Appl. No.: 274,898

[22] Filed: Jul. 14, 1995

[30] Foreign Application Priority Data

Jul. 15, 1993 [DE] Germany ............. 43 23 778.9

[51] Int. Cl.⁶ ................................ B29C 43/02
[52] U.S. Cl. ............... 264/063; 264/112; 264/234; 264/345; 428/69
[58] Field of Search ............ 264/42, 109, 321, 264/43, 112, 234, 345, 63; 428/69, 70, 71

[56] References Cited

U.S. PATENT DOCUMENTS

| | | | |
|---|---|---|---|
| 3,598,157 | 8/1971 | Farr | 138/157 |
| 4,425,291 | 1/1984 | Beer et al. | 264/42 |
| 4,533,393 | 8/1985 | Neuschaeffer et al. | |
| 4,726,974 | 2/1988 | Nowobilski et al. | |
| 4,985,163 | 1/1991 | Kratel et al. | 264/42 |
| 5,376,449 | 12/1994 | Harris et al. | 428/69 |

FOREIGN PATENT DOCUMENTS

| | | | |
|---|---|---|---|
| 669108 | 8/1963 | Canada | 264/42 |
| 0148280 | 7/1985 | European Pat. Off. | |
| 2336357 | 8/1976 | France. | |
| 1129413 | 5/1962 | Germany. | |
| 2537492 | 5/1978 | Germany. | |
| 3015245 | 10/1981 | Germany | 264/42 |
| 3246619 | 1/1988 | Germany. | |
| 298206 | 2/1992 | Germany | 264/43 |
| 57-145063 | 9/1982 | Japan | 264/43 |
| 1494280 | 12/1977 | United Kingdom. | |

OTHER PUBLICATIONS

Chemical Abstracts 6001, 92 (1980), Mar. 24, No. 12, Columbus, OH, US, 92:98605y Silicate foaming composition, Nippon Chemical Industrial Co., Ltd.
Database WPI, Section Ch, Week 8723, May 30, 1985, Derwent Publications Ltd., London, GB.
JP–49069755 A (1974).
Theodor Chvatal, Wien, Sprechsaal 108 (1975) "Stand der feuerfesten phosphatbindung heute".

*Primary Examiner*—Allan R. Kuhns
*Attorney, Agent, or Firm*—Collard & Roe, P.C.

[57] ABSTRACT

A process for producing shaped bodies having thermally insulating properties and based on foamed alkali metal silicate particles includes silicon dioxide ($SiO_2$) and alkali metal oxide ($M_2O$) (M is an alkali metal) in a molar ratio of from 2 to 4.5 ($SiO_2:M_2O$), and includes mixing 100 parts by weight of the foamed alkali metal silicate particles with an aqueous solution of monoaluminum phosphate ($Al(H_2PO_4)_3$) in such a way that the molar ratio Si:Al in the mixture ranges from 1 to 60, placing the mixture in a preselected mold and compacting the mixture to from 20% to 80% of the original volume to give a shaped body and heating the shaped body to a temperature of from 100° C. to 500° C. until a chemical reaction bond between the alkali metal silicate particles and the monoaluminum phosphate has taken place. The shaped bodies so produced can be used as thermal and sound insulation material.

11 Claims, No Drawings

PROCESS FOR PRODUCING SHAPED BODIES HAVING THERMALLY INSULATING PROPERTIES

BACKGROUND OF THE INVENTION

1. Field of the Invention

The present invention relates to a process for producing shaped bodies having thermally insulating properties and based on foamed alkali metal silicate particles comprising silicon dioxide ($SiO_2$) and alkali metal oxide ($M_2O$) (M is an alkali metal) in a molar ratio of from 2 to 4.5 ($SiO_2:M_2O$). The invention further relates to the use of the shaped bodies produced according to the process.

2. The Prior Art

Japanese published specification JP-49069755 describes a process for producing shaped bodies based on foamed alkali metal silicate particles. In a first process step, granular material of water-containing sodium silicate is heated and thus foamed. The foamed particles are subsequently sprayed with water or an aqueous sodium silicate solution, placed in a mold and fired to give shaped bodies.

German Patent DE-3246619 describes foamable and curable molding compositions of $SiO_2$, further oxides, water and foaming agents such as perborate, and processes for the production thereof. According to German Auslegeschrift DE-537492, silicate foam beads are mixed with water glass, an acid compound controlling the curing of the water glass, such as sodium fluorosilicate or phosphoric acid, and a hydrophobic agent, such as polyethylhydrosiloxane, and are solidified to give shaped bodies.

A disadvantage of the shaped bodies based on foamed alkali metal silicate particles which are produced by the known processes is their insufficient dimensional stability at high atmospheric humidity. In particular, at relatively high temperatures and high atmospheric humidity, they lose their original strength. This leads to the bonding between foamed alkali metal silicate particles being mostly lost after prolonged storage under such conditions.

SUMMARY OF THE INVENTION

It is an object of the present invention to provide a process by means of which shaped bodies can be produced which do not have the specified disadvantages of the prior art.

This object is achieved by a process for producing shaped bodies having thermally insulating properties and based on foamed alkali metal silicate particles comprising silicon dioxide ($SiO_2$) and alkali metal oxide ($M_2O$) (M is an alkali metal) in a molar ratio of from 2 to 4.5 ($SiO_2:M_2O$), which comprises:

(a) mixing 100 parts by weight of the foamed alkali metal silicate particles with an aqueous solution of monoaluminum phosphate ($Al(H_2PO_4)_3$) in such a way that the molar ratio of Si:Al in the mixture ranges from 1 to 60;

(b) placing the mixture in a preselected mold and compacting the mixture to from 20% to 80% of the original volume to give a shaped body;

(c) heating the shaped body to a temperature of from 100° C. to 500° C. until chemical reaction bonding between the alkali metal silicate particles and the monoaluminum phosphate has taken place.

Foamed alkali metal silicate particles form the basis of the shaped bodies of the invention. For the production thereof, there is prepared in a manner known per se a mixture of alkali metal silicates comprising $SiO_2$ and $M_2O$ (M is an alkali metal) in a molar ratio of from 2.0 to 4.5, preferably from 3.5 to 3.9. Such mixtures are obtained, for example, by mixing an aqueous sodium or potassium silicate solution (water glass) with amorphous silica. The origin of the silica is of subordinate importance. Precipitated silicas and also pyrogenic silicas or even natural silicates having a high $SiO_2$ content can be used. The addition of further materials, such as acid compounds which cure water glass and/or organosilicon compounds, is possible, but not essential. The production of the foamed alkali metal silicate particles is carried out by a thermal treatment of the mixture at temperatures of from 100° to 500° C. If the mixture is brought into contact as a granular material, with a hot stream of air or a hot surface, almost spherical porous alkali metal silicate particles are formed.

To produce the shaped bodies of the invention, use is preferably made of foamed alkali metal silicate particles having diameters of from 0.1 to 20 mm, particularly preferably from 2 to 6 mm. The particles used additionally have a bulk density of from 10 to 150 g/l, preferably from 30 to 50 g/l, a compressive strength at 50% compression of from 0 1 to 3 $N/mm^2$, preferably from 0 8 to 1.2 $N/mm^2$, a mean pore diameter of from 0 to 1000 µm, preferably from 150 to 200 µm, and a BET surface area of from 0.01 to 5 $m^2/g$, preferably from 0.5 to 1 $m^2/g$.

Aqueous slurries of the foamed alkali metal silicate particles described are strongly alkaline. If 2 g of the alkali metal silicate particles are milled, suspended in 50 ml of water and maintained at the boiling point for 30 minutes, then the pH of the cooled slurry, measurable with a glass electrode, is in the range from 10.0 to 11.5. Even after the addition of an amount corresponding to the invention of acid monoaluminum phosphate solution to the slurry, a pH in the range from 9.0 to 10.5 is still found after the 30-minute heating.

It is known from the literature that monoaluminum phosphate is not suitable as a binder of siliceous material in an alkaline environment (T. Chvatal in Sprechsaal 108 (1975), p. 585). It was therefore surprising to find that the above-described alkali metal silicate particles can be fired to give stable shaped bodies, if they are beforehand, in the manner of the invention, mixed with an aqueous solution and treated further. Particularly surprising is the fact that the shaped bodies thus produced are significantly superior to those of the prior art in respect of their dimensional and strength stability.

The mixing of the alkali metal silicate particles with the aqueous monoaluminum phosphate solution is preferably carried out in such a way that the solution is sprayed onto the moved particles and the particles are thus homogeneously moistened throughout. The amount of monoaluminum phosphate in the aqueous solution is matched to the amount of the alkali metal silicate particles in such a way that the molar ratio Si:Al in the mixture ranges from 1 to 60, preferably from 12 to 20. Particularly preferably, the aqueous solutions used have a monoaluminum phosphate content of from 5% to 60% by weight.

In the aqueous monoaluminum phosphate solution, there can be suspended an opacifier up to a content of 30 parts by weight (based on 100 parts by weight of the amount of alkali metal silicate particles used). The opacifiers used are inorganic oxides, mixed oxides, carbides, nitrides or carbon. Preference is given to ilmenite, the oxides of titanium, iron, chromium and zirconium, and also silicon carbide, carbon black and mixtures of the specified materials.

After mixing the foamed alkali metal silicate particles with the monoaluminum phosphate solution, the mixture is placed in a mold and pressed in the mold to from 20% to 80% of the original volume to give shaped bodies. During pressing, the gases trapped in the mixture should be able to escape through the mold. Preference is given to using molds by means of which plates, profiles or pipes can be molded. In addition, it is of course also possible to use molds for producing shaped bodies having a more complicated configuration.

The shaping step is followed by a thermal treatment of the shaped body at from 100° C. to 500° C. Although it is not essential, the shaped body and the mold are first separated from one another and only the shaped body is subjected to the thermal treatment. If the water vapor formed during heating can escape, the heat treatment can also be carried out in the mold. Depending on the geometry and the volume of the shaped body, this is preferably heated for a period of from 10 minutes to 4 hours at a temperature in the range indicated, but at least at such a temperature at which the chemical reaction bonding between the alkali metal silicate particles and the monoaluminum phosphate occurs.

Heat transfer can be carried out by convection, heat radiation, heat conduction or microwave irradiation. The reaction bonding can be monitored and confirmed by infrared spectroscopy. Heat treatment can be carried out in batch operation (discontinuously), in pulsed operation (partially continuously) or in conveyor belt operation (continuously).

After the thermal treatment, the densities of the shaped bodies are from 0,050 to 0.2 g/cm$^3$, preferably from 0.070 to 0.1 g/cm$^3$.

The shaped bodies produced according to the invention have, depending on their respective density, thermal conductivities in the range from 0.030 to 0.1 W/mK at 23° C. and are therefore particularly suitable as thermally insulating material. Due to their strength, they can be mechanically processed without problems by sawing, grinding, cutting, filing or drilling. The particular advantage of the shaped bodies lies in their excellent dimensional and strength stability in an environment having high atmospheric humidity. In the moist state after 48 hours' storage in an air-conditioned cabinet at 50° C. and 95% relative atmospheric humidity, they still have a compressive strength in accordance with German Industrial Standard DIN 53421 in the range from 0.01 to 0.1 N/mm$^2$ and a flexural strength in accordance with DIN 53452 in the range from 0.01 to 0.1 N/mm$^2$.

Paper or films, for example kraft paper, aluminum foil, cardboard-plasterboards, metal sheet, reinforced plastic film or woven fiberglass fabrics, can be adhesively bonded to the surface of the shaped bodies using appropriate adhesives, e.g., water glass or organic contact adhesives. Likewise, the shaped bodies can be provided with closed coatings, for example by immersion in or spraying with solutions of synthetic organic polymers or crosslinking silicone resins. Finally, the shaped thermal insulation bodies can also be packed in gastight coverings, the pressure within the covering being lower than atmospheric pressure, preferably lower than 10 mbar, to increase the thermally insulating properties.

The shaped bodies of the invention are preferably used as thermal insulation materials in the building sector, for example for the insulation of flat roofs or facades or in completion of the interior as suspended ceilings or intermediate walls, since they are not combustible, give off no harmful gases on heating and also contain no inorganic fibers which are hazardous to health. In addition, the shaped bodies can also be used as thermal insulation material in refrigeration engineering and in heating engineering at temperatures up to around 400° C. A further application of the shaped bodies is finally their use in sound insulation.

Other objects and features of the present invention will become apparent from the following detailed description considered in connection with the accompanying Examples, which disclose an embodiment of the present invention. It should be understood, however, that the Examples are designed for the purpose of illustration only and not as a definition of the limits of the invention.

DETAILED DESCRIPTION OF PREFERRED EMBODIMENTS

EXAMPLE 60 g of foamed sodium silicate particles having a molar ratio $SiO_2:Na_2O$ of 3.67, a particle diameter of about 3 mm, a bulk density of 37 g/l, a compressive strength at 50% compression of 1.0 N/mm$^2$, a pore diameter of about 180 μm and a BET surface area of 0.9 m$^2$/g were mixed and moistened all through with 36 g of a 50% strength (% by weight) aqueous $Al(H_2PO_4)_3$ solution (FFB 32i, from CHEMETALL GmbH, Frankfurt), so that the molar ratio Si:Al in the mixture was 13.9. The mixture was placed in a square mold having sides 200 mm long and compacted until a plate having a thickness of 20 mm was formed. This plate was heated for 1 hour at 300° C., during which the IR spectrum of the substance changed. After cooling, the shaped body had a density of 0.104 g/cm$^3$, a compressive strength in accordance with DIN 53 421 of 0.14 N/mm$^2$, a flexural strength in accordance with DIN 53 452 of 0.10 N/mm$^2$ and a thermal conductivity value of 0.0457 W/mK (measured using a HESTO-Lambda-CONTROL A50 instrument from HESTO, Langen).

After storage for 48 hours in an air-conditioned cabinet at 50° C. and 95% relative atmospheric humidity, the moist plate still had a compressive strength of 0.03 N/mm$^2$ and a flexural strength of about 0.03 N/mm$^2$.

COMPARATIVE EXAMPLE 60 g of the foamed sodium silicate particles specified in Example 1 were sprayed with 36 g of water instead of $Al(H_2PO_4)_3$ solution and further processed as described above.

After storage for 48 hours at 50° C. and 95% relative atmospheric humidity, the plate could not longer be taken undamaged from the air-conditioned cabinet. Measurement of the compressive and flexural strength was no longer possible.

These examples demonstrate the superior dimensional stability of the shaped body prepared according to the process of the invention.

While only one embodiment of the present invention has been shown and described, it is to be understood that many changes and modifications may be made thereunto without departing from the spirit and scope of the invention as defined in the appended claims.

What is claimed is:

1. A process for producing shaped bodies having thermally insulating properties and based on foamed alkali metal silicate particles comprising silicon dioxide ($SiO_2$) and alkali metal oxide ($M_2O$) (M is an alkali metal) in a molar ratio of from 2 to 4.5 ($SiO_2:M_2O$), comprising:

(a) mixing 100 parts by weight of the foamed alkali metal silicate particles with an aqueous solution of monoaluminum phosphate ($Al(H_2PO_4)_3$) in such a way that the molar ratio of Si:Al in the mixture ranges from 1 to 60;

(b) placing the mixture in a preselected mold and compacting the mixture thereby reducing its volume to from 20% to 80% to give a shaped body;

(c) heating the shaped body to a temperature of from 100° C. to 500° C. until chemical reaction bonding between the alkali metal silicate particles and the monoaluminum phosphate has taken place.

2. The process as claimed in claim 1,
wherein the monoaluminum phosphate content of the aqueous solution is from 5% to 60% by weight.

3. The process as claimed in claim 1, comprising
suspending from 0 to 30 parts by weight (based on the amount of the alkali metal silicate particles) of an inorganic opacifier in the aqueous monoaluminum phosphate solution, prior to mixing in accordance with step (a) of the process.

4. The process as claimed in claim 1, comprising
spraying the aqueous monoaluminum phosphate solution onto the alkali metal silicate particles during step (a) of the process.

5. The process as claimed in claim 1, comprising
preselecting molds suitable for molding plates, profiles or pipes during step (b) of the process.

6. The process as claimed in claim 1, comprising
mechanically processing the shaped body.

7. The process as claimed in claim 1, comprising
adhesively bonding paper or film to the shaped body.

8. The process as claimed in claim 1, comprising
providing the shaped body with a closed coating or packing the shaped body in a gas-tight, evacuated covering.

9. A process for producing shaped bodies having thermally insulating properties and based on foamed alkali metal silicate particles comprising silicon dioxide ($SiO_2$) and alkali metal oxide ($M_2O$) (M is an alkali metal) in a molar ratio of from 2 to 4.5 ($SiO_2:M_2O$), comprising:

(a) mixing 100 parts by weight of the foamed alkali metal silicate particles with an aqueous solution of monoaluminum phosphate ($Al(H_2PO_4)_3$) in such a way that the molar ratio of Si:Al in the mixture ranges from 12 to 20;

(b) placing the mixture in a preselected mold and compacting the mixture thereby reducing its volume to from 20% to 80% to give a shaped body;

(c) heating the shaped body to a temperature of from 100° C. to 500° C. until chemical reaction bonding between the alkali metal silicate particles and the monoaluminum phosphate has taken place.

10. The process as claimed in claim 9,
wherein the molar ratio of ($SiO_2:M_2O$) is from 3.5 to 3.9.

11. The process as claimed in claim 9,
wherein the temperature is 300° C.

\* \* \* \* \*

UNITED STATES PATENT AND TRADEMARK OFFICE
CERTIFICATE OF CORRECTION

PATENT NO. : 5,543,095
DATED : AUGUST 6, 1996
INVENTOR(S) : KATZER ET AL

It is certified that error appears in the above-indentified patent and that said Letters Patent is hereby corrected as shown below:

Cover page, column 1, item 22, the filing date should be Jul. 14, 1994.

Signed and Sealed this

Seventh Day of January, 1997

*Attest:*

BRUCE LEHMAN

*Attesting Officer*  *Commissioner of Patents and Trademarks*